United States Patent [19]

Koch

[11] Patent Number: 4,558,560
[45] Date of Patent: Dec. 17, 1985

[54] PIVOT TONGUE HARVESTER WITH LATERAL TRANSPORT

[75] Inventor: Earl E. Koch, Mohnton, Pa.

[73] Assignee: Sperry Corporation, New Holland, Pa.

[21] Appl. No.: 652,365

[22] Filed: Sep. 19, 1984

[51] Int. Cl.<sup>4</sup> ............................................ A01B 73/00
[52] U.S. Cl. ........................................ 56/228; 56/192
[58] Field of Search ............................ 56/1, 228, 192; 280/415 R, 415 B, 43.23; 172/240, 241, 244, 625

[56] References Cited

U.S. PATENT DOCUMENTS

| | | | |
|---|---|---|---|
| 2,509,824 | 5/1950 | Johnson | 56/228 |
| 2,833,105 | 5/1958 | Naery | 56/228 |
| 3,142,144 | 7/1964 | Ronning | 56/228 |
| 3,721,461 | 3/1973 | Nelsen et al. | 56/228 |
| 3,868,811 | 3/1975 | Cicci et al. | 56/1 |
| 3,919,831 | 11/1975 | Halls et al. | 56/228 |
| 3,962,853 | 6/1976 | Schwalm et al. | 56/228 |
| 4,081,946 | 4/1978 | Ehrhart | 56/14.4 |
| 4,435,948 | 3/1984 | Jennings | 56/228 |

Primary Examiner—Gene Mancene
Assistant Examiner—David I. Tarnoff
Attorney, Agent, or Firm—Larry M. Miller; Frank A. Seemar; Darrell F. Marquette

[57] ABSTRACT

A crop harvesting machine having a pivoted drawbar forwardly extending harvesting apparatus is disclosed wherein the drawbar can be positioned in a transversely extending direction to permit a transportation of the harvester in a transverse direction when mounted on a mobile carrier. A support plate on which stops are provided to limit the operative range of pivotal movement of the drawbar is selectively movable to change the position of the stops relative to the frame of the harvester and permit the drawbar to be pivoted to a transversely extending position. By positioning the harvester upon a mobile carrier the harvester can be transported in a transverse direction without disconnecting the drawbar from the prime mover.

18 Claims, 9 Drawing Figures

1

PIVOT TONGUE HARVESTER WITH LATERAL TRANSPORT

BACKGROUND OF THE INVENTION

The present invention relates generally to crop harvesting machines and, more particularly, to improvements in hay harvesting machines utilizing an over-the-top pivoted drawbar to permit a lateral transport of the harvester by utilizing the pivoted drawbar as the towing instrument.

Generally, harvesting equipment, particularly hay harvesting equipment, has been manufactured with a transverse width that would permit transport thereof over the highway and through farm gates rearwardly of the prime mover. Although the hay harvesting machines commonly referred to as pivot tongue windrowers, such as the type shown in U.S. Pat. No. 4,081,946 granted on April 4, 1978, to Philip J. Ehrhart, were generally wider in a transverse direction than previous pull-type hay harvesting machines, the centrally mounted pivoted drawbar permitted a towing of the harvester directly behind the prime mover in a centrally located position and, therefore, transport of the harvester in a normal orientation was not prohibited.

However, increasing transverse widths of such harvesting machines prevents the harvester from being towed over the highway and through restricted openings behind the prime mover in a normal orientation, necessitating the provision of alternate means of transporting the harvester. Two methods of transporting agricultural implements in a transverse orientations, which narrows overall transport width because the longitudinal length of the machines is less than the transverse width, can be seen in U.S. Pat. No. 3,962,853 and in U.S. Pat. No. 3,721,461. Such apparatus requires a movement of wheels, hitches, jacks, etc. to equip the harvester for movement in a transverse direction, including the disconnection and reconnection of appropriate hitches with the prime mover. Accordingly, it would be desirable to provide a more conveniently used apparatus for transporting a harvesting machine in a transverse orientation to reduce the overall transport width of the harvester.

SUMMARY OF THE INVENTION

It is an object of this invention to overcome the aforementioned disadvantages of the prior art by providing a pivot tongue hay harvesting machine in which the tongue is shiftable from a normal longitudinally extending operative range of positions to a transversely extending transport position.

It is another object of this invention to mount stops defining the normal operative range of movement of a pivotable drawbar on a movable plate to permit the stops to be relocated when transport of the harvesting machine is desired.

It is an advantage of this invention that the overall transport width of a harvesting machine can be reduced to the size of its longitudinal length.

It is a feature of this invention that the stops defining the operative range of movement of the pivotal drawbar of a hay harvesting machine can be repositioned to permit the drawbar to be shifted into a transversely extending position.

It is another feature of this invention that a harvesting machine can be mounted on a mobile carrier and towed in a transverse position by utilizing the drawbar of the harvesting machine as the towing member.

It is another advantage of this invention that the harvesting machine can be transported in a transverse orientation without requiring a repositioning of wheels and hitches.

It is a further advantage of this invention that a harvesting machine can be converted from a normal operating orientation into a transversely extending transport orientation without unhitching the harvesting machine drawbar from the prime mover.

It is still another object of this invention to provide a locking mechanism to affix a selectively movable plate for supporting stops engageable with a pivotal drawbar into a selected position relative to the frame.

It is a further feature of this invention that the locking mechanism is provided with a spring loaded pin operable to bias the locking mechanism into a locking position.

It is a further object of this invention to provide an apparatus for transporting a harvesting machine in a transverse orientation which is durable in construction, inexpensive of manufacture, carefree of maintenance, facile in assemblage, and simple and effective in use.

These and other objects, features and advantages are accomplished according to the instant invention by providing a crop harvesting machine having a pivoted drawbar and forwardly extending harvesting apparatus wherein the drawbar can be positioned in a transversely extending direction to permit a transportation of the harvester in a transverse direction when mounted on a mobile carrier. A support plate on which stops are provided to limit the operative range of pivotal movement of the drawbar is selectively movable to change the position of the stops relative to the frame of the harvester and permit the drawbar to be pivoted to a transversely extending position. By positioning the harvester upon a mobile carrier the harvester can be transported in a transverse direction without disconnecting the drawbar from the prime mover.

BRIEF DESCRIPTION OF THE DRAWINGS

The advantages of this invention will become apparent upon consideration of the following detailed disclosure of the invention, especially when taken in conjunction with the accompanying drawings wherein:

FIG. 9 is an elevational view of the locking mechanism engageable between the movable support plate and the frame corresponding to lines 9—9 of FIG. 4.

DETAILED DESCRIPTION OF THE PREFERRED EMBODIMENT

Figure 1:
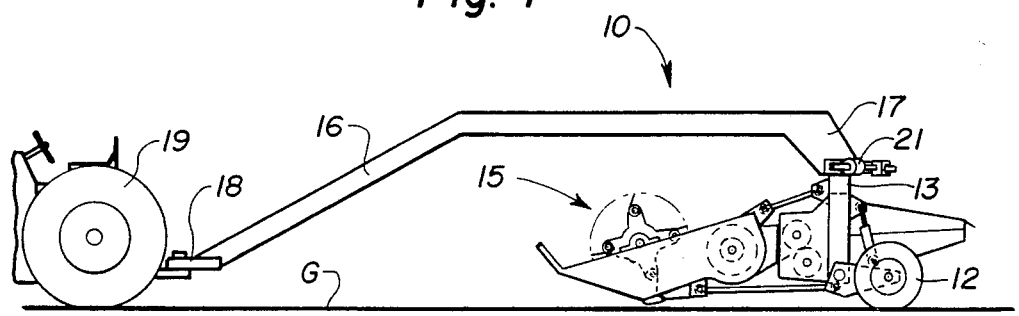
FIG. 1 is a side elevational view of a harvesting machine incorporating the principles of the instant invention, the harvesting machine being attached to a prime mover.
Figure 2:
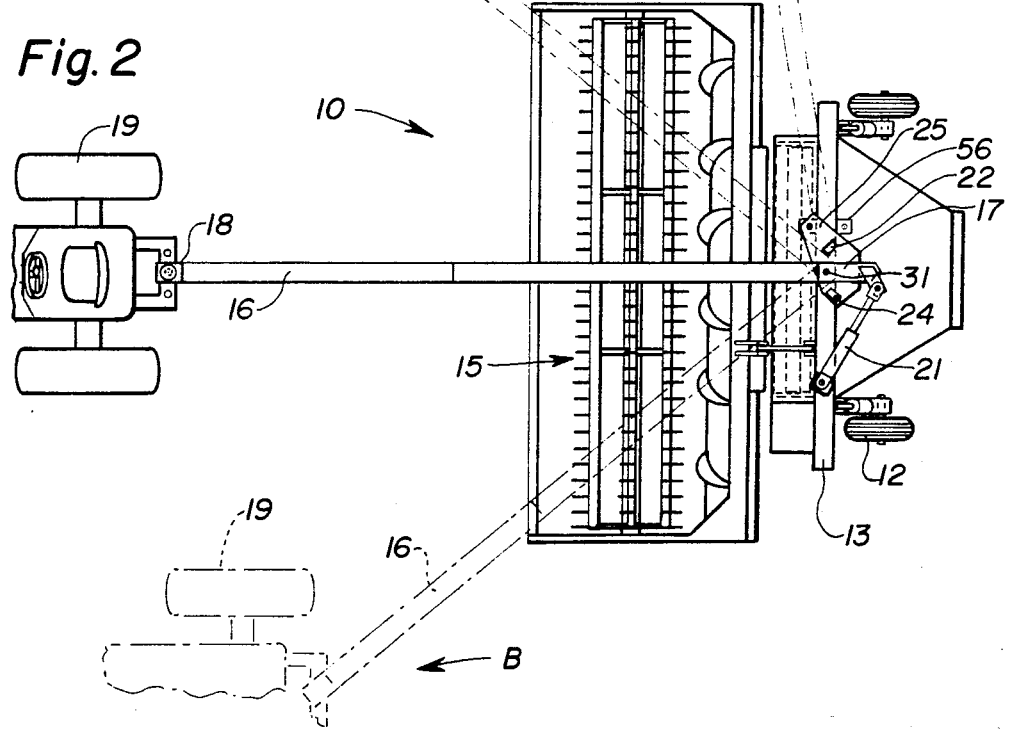
FIG. 2 is a top plan view of the harvesting machine seen in FIG. 1, the operative range of movement of the drawbar being shown in phantom to either side of the centrally located medial position, the transversely extending transport position of the drawbar also being shown in phantom.

Referring now to the drawings and, particularly, to FIGS. 1 and 2, a hay harvesting machine, commonly referred to as a pivot tongue mower-conditioner, can be seen. Any left and right references are used as a matter of convenience and are determined by standing at the rear of the machine, facing the longitudinally spaced forward end, the direction of travel during operation of the harvesting machine. The hay harvesting machine 10 is provided with a wheeled frame 12 which includes a main transverse support beam 13. Harvesting apparatus 15 shown in the form of a conventional header floatingly supported from the frame 12 for movement relative thereto for following varying contours of the ground G, is mounted forwardly of the frame 12 to engage standing crop material and initiate the harvesting process. A drawbar 16 pivotally connected to the frame 12 at a pivot end 17 is positioned proximate to the longitudinally extending center line of the machine 10 and extends forwardly over top of the crop harvesting header 15 for connection at a hitch end 18 to a prime mover 19.

Figure 3:
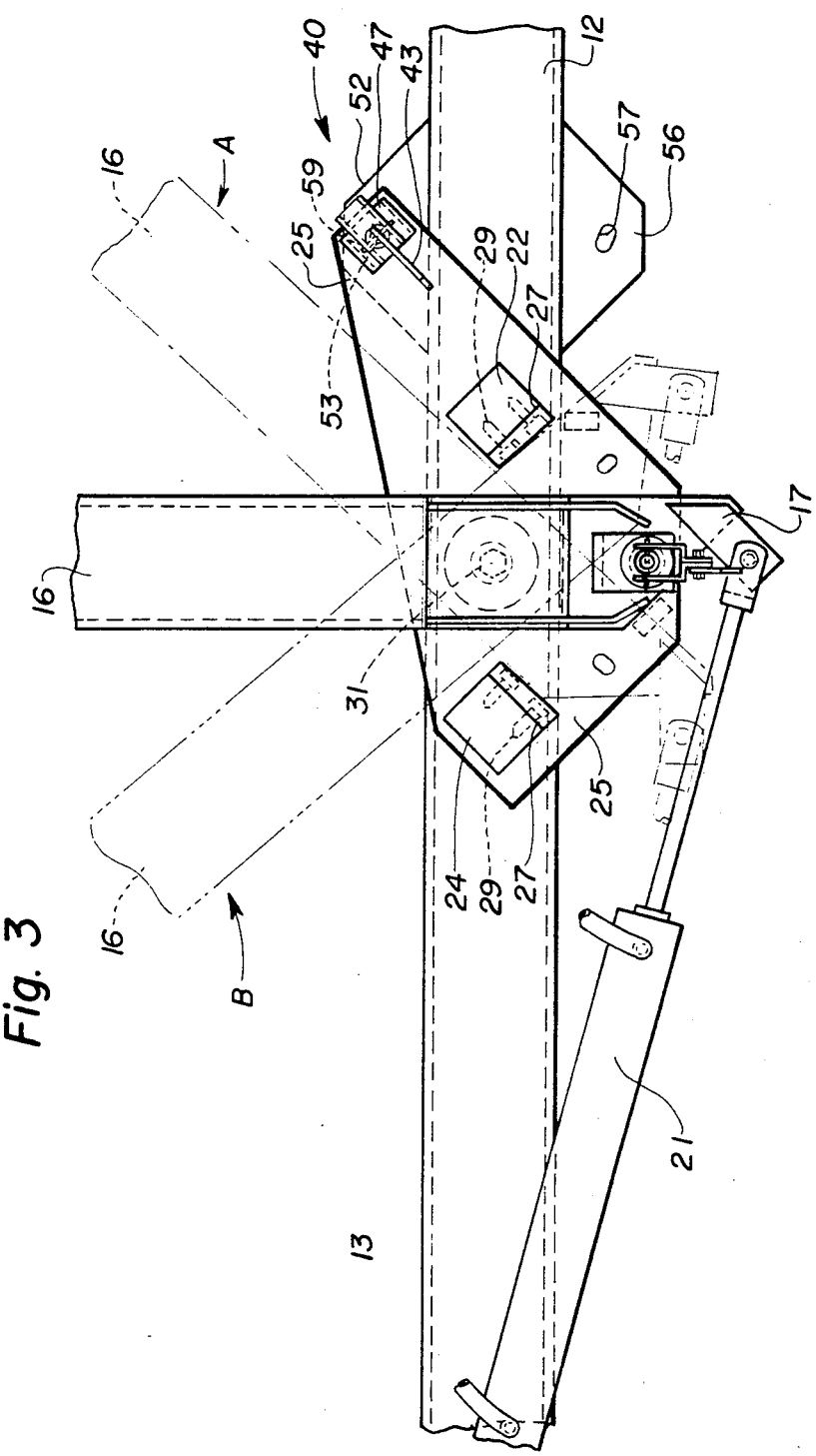
FIG. 3 is an enlarged plan view of a portion of the harvesting machine seen in FIG. 2 where the drawbar is pivotally mounted on the frame, the movable plate being shown in a position corresponding to the normal operative range of positions of the drawbar, the operative range of movement of the drawbar being shown in phantom.

As is previously known in the art, the positioning of the drawbar 16 near the center of the machine 10 permits the harvester 10 to be infinitely positioned within a normal operative range between position A, wherein the harvester 10 is outboard to the left of the prime mover 19, and position B, wherein the harvester 10 is positioned outboard to the right of the prime mover 19. Pivotal movement of the drawbar 16 is affected by manipulation of a hydraulic cylinder 21 interconnecting the pivoted end 17 of the drawbar 16 and the transverse beam 13 of the frame 12. As best seen in FIGS. 2 and 3, the extreme limits of the normal operative range of pivotal movement of the drawbar 16 is defined by stops 22,24 mounted on a support plate 25 to either side of the pivot axis of the drawbar 16. To vary the operative range of movement of the drawbar 16, the size of the stops 22,24 can be changed by adding a wedge-shaped stop extension 27 fastened to the primary stop 22,24 by fasteners 29.

Figure 4:
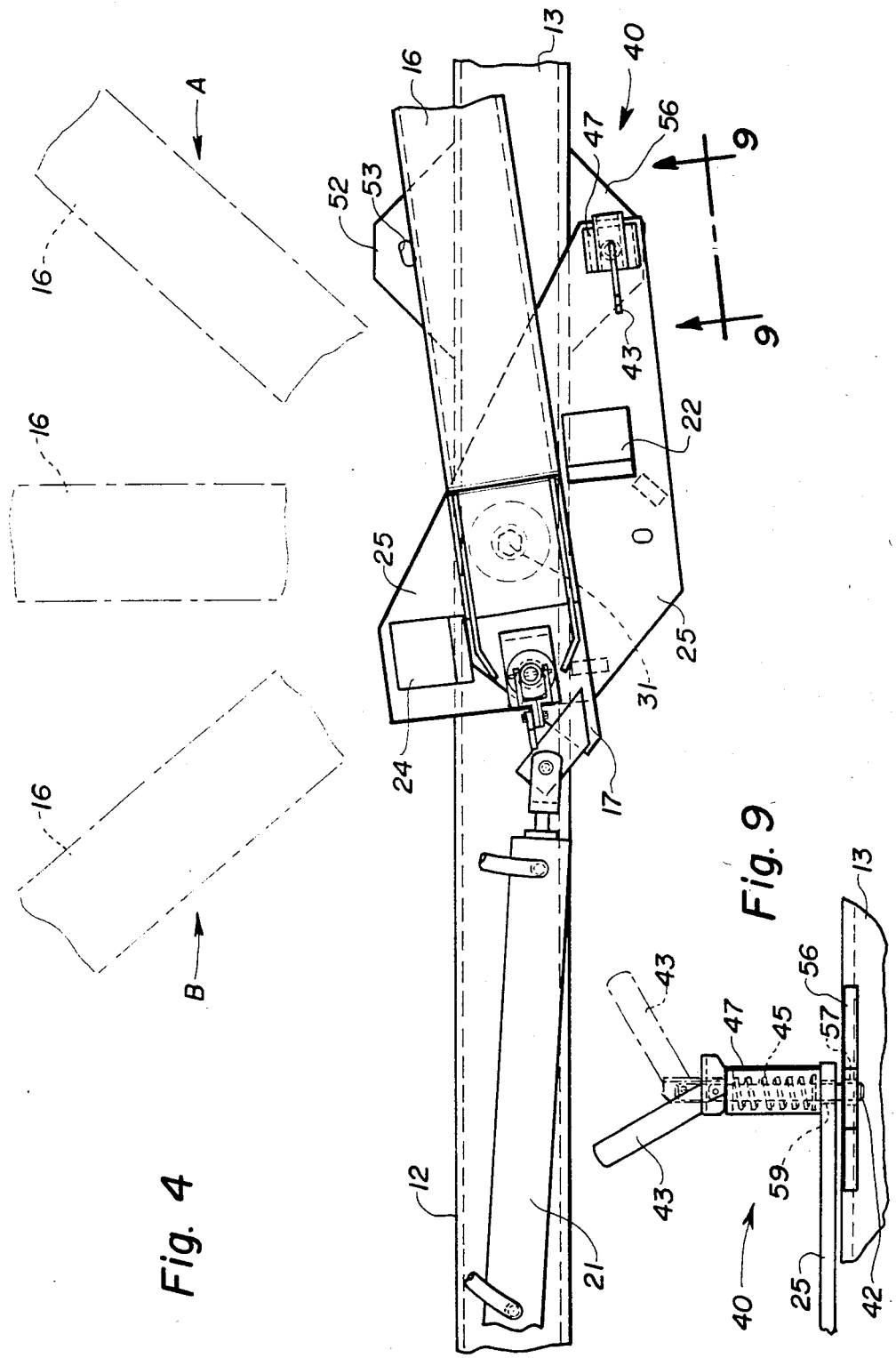
FIG. 4 is an enlarged top plan view similar to the view of FIG. 3 but with the movable plate moved into a second position to permit the drawbar to be positioned in a transversely extending direction, the normal operative range of movement of the drawbar being shown in phantom.
Figure 5:
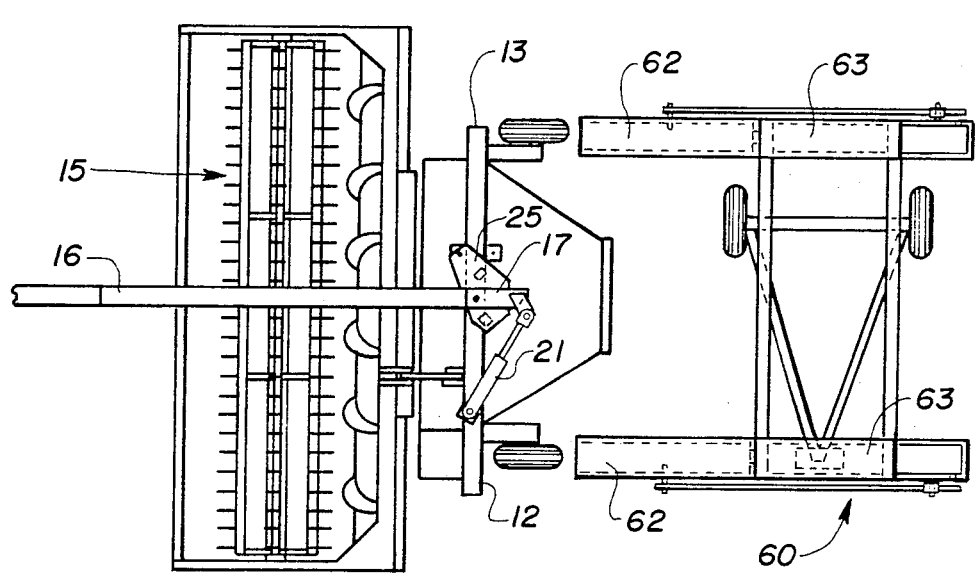
FIG. 5 is a schematic top plan view of the harvesting machine seen in FIGS. 1 and 2 prior to being loaded on a mobile carrier.
Figure 6:
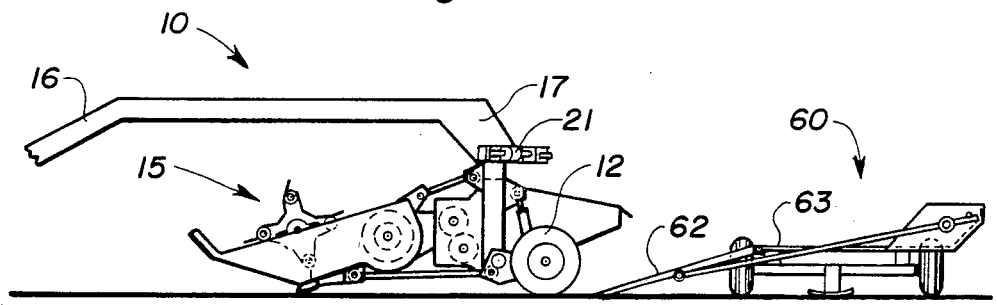
FIG. 6 is a schematic side elevational view of the harvesting machine and mobile carrier seen in FIG. 5.

Referring now to FIGS. 3 and 4, it can be seen that the support plate 25 is movable between a first position shown in FIG. 3 and corresponding to the operative range of movement of the drawbar 16 and a second position seen in FIG. 4 in which the stops 22,24 are repositioned to permit the drawbar 16 to be moved into a transversely extending direction. The center of rotation of the support plate 25 corresponds to the pivot axis 31 of the drawbar 16. By moving the support plate 25 to the second position, as shown in FIG. 4, the relative positions of the stops 22,24 rotate about the pivot axis 31 to shift the extreme limits of movement of the drawbar 16 and permit the drawbar 16 to be moved into the transversely extending position seen in solid lines in FIG. 4.

Referring now to FIGS. 4 and 9, a locking mechanism 40, operable to fix the position of the support plate 25 relative to the frame 12 and to permit selective movement of the support plate 25 between the first and second positions, can be seen. The locking mechanism 40 includes a locking pin 42 engageable with an actuating lever 43 to affect a vertical movement of the locking pin 42. A spring 45 is captured between the top of a mounting bracket 47 and a washer 48 affixed to the locking pin 42. The spring 45 will bias the locking pin 42 into an engagement position similar to the operation of the transport locking actuator seen in U.S. Pat. No. 4,418,518, the description of which is incorporated herein by reference.

The main transverse beam 13 is provided with opposing brackets 52,56 corresponding to the first and second positions, respectively, of the mounting plate 25. Brackets 52,56 are provided with holes 53,57, respectively, extending therethrough in a vertical manner. An opening 59 in the support plate 25 is alignable with both holes 53,57 upon rotation of the support plate 25 about the pivot axis 31. The locking pin 42 is projectable through the opening 59 into either the hole 53 or the hole 57 to lock the support plate 25 in the first or second positions, respectively. By utilizing the spring loaded locking mechanism 40 in the manner described in U.S. Pat. No. 4,418,518, the locking pin 42 will be automatically dropped into the hole 53,57, corresponding to the position of the support plate 25 that is desired, when the drawbar 16 is shfited about its axis 31.

In operation, to move the support plate 25 from the first position to the second position, the locking pin 42 is withdrawn from the hole 53 to permit the support plate 25 to move relative to the cross beam 13 of the frame 12. A manipulation of the hydraulic cylinder 21 to pivotally move the drawbar 16 against the right hand stop 22 will affect a rotation of the support plate 25 until the spring-loaded locking pin 42 drops through the hole 57 in the frame 12, at which point, the drawbar 16 will be in the transversely extending position seen in solid lines in FIG. 4. To return the drawbar 16 to its normally operative range of positions, the locking mechanism 40 is actuated to release the locking pin 42 from the hole 57. A subsequent manipulation of the hydraulic cylinder 21 to pivotally move the drawbar 16 against the left hand stop 24 will affect a corresponding rotation of the support plate 25 until the locking pin 42 drops through the hole 53 in the frame 12, at which point the support plate 25 has moved into the first position shown in FIG. 3 to align the stops 22,24 to limit the pivotal movement of the drawbar 16 within its normal operative range shown in phantom in FIGS. 3 and 4.

Referring now to FIGS. 5-8, it can be seen how the above described pivot tongue mechanism can be utilized to transport the harvesting machine in a transverse orientation to minimize the transport width of an over-the-highway transportation of the harvester. As noted above, the longitudinal length of the harvesting machine 10 is a smaller dimension than the transverse width; hence, the overall transport width of the harvesting machine would be smaller if the machine were towed in a transverse orientation.

Figure 7:
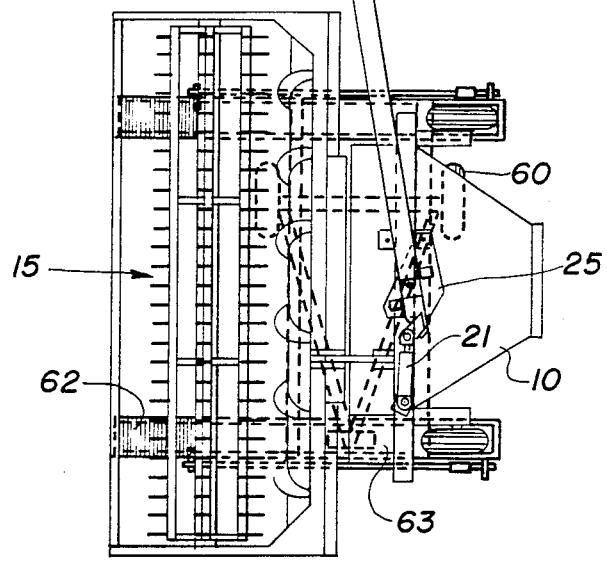
FIG. 7 is a schematic top plan view of the harvesting machine seen in FIGS. 5 and 6 after being loaded onto the mobile carrier and the drawbar positioned in a transverse extending direction to permit transport of the harvesting machine in a transverse orientation.
Figure 8:
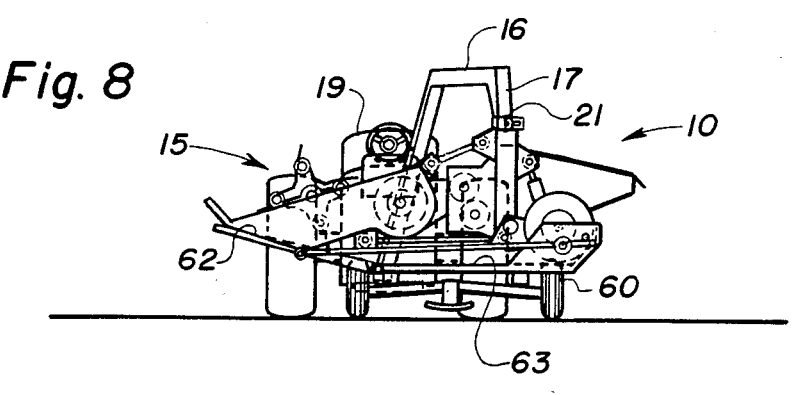
FIG. 8 is a schematic elevational view of the harvester and mobile carrier seen in FIG. 7, the prime mover being seen behind the harvesting machine.

A wheeled carrier 60 can be utilized to permit transport of the harvester 10 in a transverse orientation. The carrier 60 is provided with loading ramps 62 to facilitate an elevating of the harvester 10 onto the platform 63 of the carrier 60. After the harvester 10 has been loaded onto the platform 63, the drawbar 16 can be swung into a transversely extending direction, as shown in FIG. 7. One skilled in the art will realize that the holes 53,57 in the frame brackets 52,56 are positioned to locate the hitch end of the drawbar 16 at a position, when connected to the prime mover 19, to effect a central towing position behind the prime mover 19. As best seen in FIG. 7, this results in the generally transversely extending drawbar 16 not extending at a direction exactly perpendicular to the normal direction of travel of the harvester 10 during operation thereof.

It will be understood that changes in the details, materials, steps and arrangements of parts which have been described and illustrated to explain the nature of the invention will occur and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a harvesting machine having a mobile frame adapted for movement over the ground; harvesting apparatus supported by said frame to harvest crop material; a drawbar having one end pivotally connected to said frame for pivotal movement through an operative range of generally longitudinally extending angular positions relative to said frame and a distal end adapted for connection to a prime mover said range of angular positions being limited by first and second stops mounted on a support plate; and an actuator interconnecting said drawbar and said frame to effect the movement of said drawbar through said operative range, the improvement comprising:
said support plate being movable from a first position corresponding to said operative range and a second position in which the corresponding positioning of said stops permits said drawbar to be positioned in a transversely extending direction.

2. The harvesting machine of claim 1 further comprising locking means for releasably connecting said support plate to said frame for selectively retaining said support plate in said first and second positions.

3. The harvesting machine of claim 2 wherein said frame is provided with first and second retention holes corresponding, respectively, to said first and second positions, said support plate having an opening extending therethrough and being selectively alignable with said first and second holes in said frame, said locking means having a pin engageable through said opening and one of said holes to lock said support plate in the corresponding position.

4. The harvesting machine of claim 3 wherein said locking means includes a spring-loaded biasing mechanism to urge said pin toward engagement with said support plate and said frame by extending said pin through said opening and one of said holes.

5. The harvesting machine of claim 3 wherein said actuator includes a hydraulic cylinder operable to swing said drawbar about the pivotal connection thereof with said frame.

6. The harvesting machine of claim 3 wherein said harvesting machine is transportable in a transverse direction by utilizing said drawbar when said harvesting machine is loaded on a wheeled carrier, the longitudinal length of said harvesting machine being less than the transverse width thereof.

7. The harvesting machine of claim 3 wherein said drawbar is extendable over said harvesting apparatus through at least a portion of the operative range of movement thereof.

8. The harvesting machine of claim 7 wherein said drawbar is pivotally connected to said frame proximate to the longitudinally extending centerline of said harvesting machine.

9. A crop harvesting machine comprising:
a mobile frame adapted for movement over the ground;
harvesting apparatus supported by said frame and extending forwardly thereof to engage and harvest crop material;
a drawbar pivotally mounted at one end on said frame for movement through an operative range of generally longitudinally extending positions, said drawbar having a distal end adapted for connection to a prime mover, the pivotal movement of said drawbar through said operative range providing varying positions of said crop harvesting machine relative to said prime mover;
a support plate movably supported on said frame and having first and second stops affixed mounted thereon, said stops being engageable with said drawbar to provide extreme limits of said operative range of movement, said support plate being movable between a first position to provide said operative range of movement and a second position to shift the positioning of said stops to permit said drawbar to extend in a generally transversely extending direction;
locking means supported by said frame for selectively locking said support plate relative to said frame in said first and second positions; and
means for selectively actuating the pivotal movement of said drawbar.

10. The crop harvesting machine of claim 9 wherein drawbar is pivotally mounted proximate to the longitudinally extending centerline of said crop harvesting machine to permit operation of said crop harvesting machine on either side of the prime mover.

11. The crop harvesting machine of claim 10 wherein said locking means includes a pin engageable through an opening in said support plate and a hole in said frame corresponding to each respective position of said support plate.

12. The crop harvesting machine of claim 11 wherein said locking means further includes a spring-loading mechanism mounted on said support plate and engageable with said pin to selectively bias said pin into engagement between said support plate and said frame.

13. The crop harvesting machine of claim 12 wherein the longitudinal length of said crop harvesting machine is less than the transverse width of said crop harvesting machine, said crop harvesting machine being transportable in a transverse direction when supported on a mobile carrier by utilizing said drawbar extending in a generally transverse direction as the towing member.

14. A method of transporting a pull-type crop harvesting machine connected by a drawbar to a prime mover comprising the steps of:

loading the harvesting machine on a wheeled carrier positioned for a normal direction of travel perpendicular to the operative direction of travel of said harvesting machine, such that said harvesting machine is elevated above the ground;

positioning the drawbar of said harvesting machine in a transversely extending direction without disconnecting said drawbar from said prime mover by shifting a support plate supporting a pair of stops defining an operative range of movement of said drawbar to reposition said stops and permit said drawbar to be positioned in a transversely extending direction; and towing said harvesting machine on said carrier in said direction of travel perpendicular to the operative direction of travel of said harvesting machine by using said drawbar as the towing connection between said prime mover and said wheeled carrier.

15. The method of claim 14 wherein said positioning step further includes the step of:

releasing a locking mechanism releasably positionally fixing said support plate to the frame of said crop harvesting machine before said shifting step.

16. The method of claim 15 wherein said shifting step includes the step of:

driving said prime mover to a position transverse of said crop harvesting machine after said releasing step to engage said drawbar with one of said stops and positionally move said support plate.

17. The method of claim 16 wherein said positioning step further includes the step of:

re-engaging said locking mechanism for releasably positionally affixing said support plate relative to said frame after said shifting step.

18. The method of claim 17 wherein said loading step includes the step of:

backing said crop harvesting machine up a loading ramp to position said crop harvesting machine on an elevated platform of said wheeled carrier.

* * * * *